(12) United States Patent
Eggert et al.

(10) Patent No.: US 11,061,792 B2
(45) Date of Patent: Jul. 13, 2021

(54) TEST SYSTEM FOR TESTING A COMPUTER OF A COMPUTER SYSTEM IN A TEST NETWORK

(71) Applicant: Deutsche Telekom AG, Bonn (DE)

(72) Inventors: Markus Eggert, Hennef (DE); Daniel Hauenstein, Bonn (DE)

(73) Assignee: DEUTSCHE TELEKOM AG, Bonn (DE)

( * ) Notice: Subject to any disclaimer, the term of this patent is extended or adjusted under 35 U.S.C. 154(b) by 439 days.

(21) Appl. No.: 15/545,339

(22) PCT Filed: Dec. 4, 2015

(86) PCT No.: PCT/EP2015/078671
§ 371 (c)(1),
(2) Date: Jul. 21, 2017

(87) PCT Pub. No.: WO2016/119953
PCT Pub. Date: Aug. 4, 2016

(65) Prior Publication Data
US 2017/0371697 A1    Dec. 28, 2017

(30) Foreign Application Priority Data

Jan. 30, 2015 (DE) .................... 10 2015 101 388.6

(51) Int. Cl.
*G06F 11/26* (2006.01)
(52) U.S. Cl.
CPC ................. *G06F 11/261* (2013.01)

(58) Field of Classification Search
CPC ..................................... G06F 11/261
USPC ........................................... 703/21
See application file for complete search history.

(56) References Cited

U.S. PATENT DOCUMENTS

| 7,747,494 B1 | 6/2010 | Kothari et al. |
| 8,515,015 B2 | 8/2013 | Maffre et al. |
| 9,485,276 B2* | 11/2016 | Quinlan ................. H04L 67/42 |
| 2002/0095454 A1* | 7/2002 | Reed .................. G06Q 30/0601 |
| | | 709/201 |
| 2003/0056116 A1 | 3/2003 | Bunker et al. |
| 2005/0008001 A1 | 1/2005 | Williams et al. |

(Continued)

FOREIGN PATENT DOCUMENTS

| JP | 2003271469 A | 9/2003 |
| JP | 2004504662 A | 2/2004 |

(Continued)

OTHER PUBLICATIONS

Yoon, Jun, and Wontae Sim. "Implementation of the automated network vulnerability assessment framework." 2007 Innovations in Information Technologies (IIT). IEEE, 2007. pp. 153-157. (Year: 2007).*

(Continued)

*Primary Examiner* — Kamini S Shah
*Assistant Examiner* — John E Johansen
(74) *Attorney, Agent, or Firm* — Leydig, Voit & Mayer, Ltd.

(57) ABSTRACT

A test system for testing a particular computer of a particular computer system in a test network includes: a simulation server configured to emulate a test object; and a control entity for controlling the simulation server, wherein the control entity is configured to instruct the simulation server to generate a virtual test object for emulating the test object, and to instruct a test entity to test the virtual test object generated by the simulation server.

14 Claims, 4 Drawing Sheets

(56) References Cited

U.S. PATENT DOCUMENTS

| | | | |
|---|---|---|---|
| 2005/0071838 A1* | 3/2005 | Hatasaki | G06F 8/64 |
| | | | 717/168 |
| 2005/0268338 A1 | 12/2005 | Made | |
| 2006/0218640 A1 | 9/2006 | Lotem et al. | |
| 2012/0079596 A1* | 3/2012 | Thomas | G06F 21/566 |
| | | | 726/24 |
| 2012/0310585 A1* | 12/2012 | Oliveira | H04L 67/12 |
| | | | 702/119 |
| 2013/0117741 A1* | 5/2013 | Prabhakaran | G06F 11/1484 |
| | | | 718/1 |
| 2013/0166273 A1 | 6/2013 | Suga | |
| 2013/0219496 A1 | 8/2013 | Nie et al. | |
| 2016/0140345 A1 | 5/2016 | Kojima et al. | |

FOREIGN PATENT DOCUMENTS

| | | |
|---|---|---|
| JP | 2005107803 A | 4/2005 |
| JP | 2006518080 A | 8/2006 |
| JP | 2007058596 A | 3/2007 |
| JP | 2013134617 A | 3/2013 |
| JP | 2014504388 A | 2/2014 |
| JP | 2015011827 A1 | 3/2017 |
| WO | WO 2012166591 A1 | 12/2012 |
| WO | WO-2015011827 A1 * | 1/2015 ........... G06F 21/577 |

OTHER PUBLICATIONS

Mahmoud T. Qassrawi, et al., "Deception Methodology in Virtual Honeypots", 2010 Second International Conference on Networks Security, Wireless Communications and Trusted Computing, Apr. 24-25, 2010, pp. 462-467.

Yimin Cui, et al., "Network Security Simulation and Evaluation", Proceedings of the 5$^{th}$ International Conference on Soft Computing as Transdisciplinary Science and Technology, Oct. 28-31, 2008, pp. 55-58.

* cited by examiner

TEST SYSTEM FOR TESTING A COMPUTER OF A COMPUTER SYSTEM IN A TEST NETWORK

CROSS-REFERENCE TO RELATED APPLICATIONS

This application is a U.S. National Phase application under 35 U.S.C. § 371 of International Application No. PCT/EP2015/078671, filed on Dec. 4, 2015, and claims benefit to German Patent Application No. DE 10 2015 101 388.6, filed on Jan. 30, 2015. The International application was published in German on Aug. 4, 2016 as WO 2016/119953 A1 under PCT Article 21(2).

FIELD

The present disclosure relates to a test system for testing a computer of a computer system in a test network and a method for testing a computer of a computer system in a test network. The disclosure in particular relates to a method for automating tests or safety tests in a communication network and a simulation server (Honeypot) for simulating test-objects.

BACKGROUND

In order to monitor the state of a network element, such as a server, router, switch, etc., and to test, for example, its proper configuration or the topicality of the software status, two methods are essentially established: firstly, the use of a central test entity with direct access to all network elements; secondly, the use of so-called agents, i.e., additional software packages on all network elements which communicate with a central test entity. Problems concerning safety and complexity, however, arise during a direct access of the central test entity to all network elements or of the installation of agents to the network elements. By the direct access to the network elements, safety-critical data of the test entity or the agents can be recognized and manipulated under certain circumstances.

The installation of an agent on each network element also imposes high complexity requirements, in particular during the test of large computer systems with a plurality of computers or servers.

SUMMARY

A test system for testing a particular computer of a particular computer system in a test network. The test network comprises a test entity for testing computers of the computer system. The particular computer is a test object. The test system comprises: a simulation server configured to emulate the test object; and a control entity for controlling the simulation server, wherein the control entity is configured to instruct the simulation server to generate a virtual test object for emulating the test object, and to instruct the test entity to test the virtual test object generated by the simulation server.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Exemplary embodiments of the present disclosure provide an approach for a simple and safe test of computers of a computer system.

The apparatuses, methods and systems described below can be of different types. Each individually described element can be realized by hardware or software components, such as electronic components which can be produced by different technologies, and can comprise, for example, semiconductor chips, ASICs, microprocessors, digital signal processors, integrated electrical circuits, electro-optical circuits and/or passive components.

The apparatuses, methods and systems described below can be used to determine software versions, patch versions and configurations of computers of a computer system. A patch denotes here an updated corrected version for software or data from the viewpoint of an end user, to fix security vulnerabilities, to repair errors or to upgrade functions not available to date. These updates are also called service pack from some producers, when they comprise a plurality of combined patches.

According to a first aspect the disclosure relates to a test system for testing a particular computer of a particular computer system in a test network, wherein the test network comprises a test entity for testing computers of the computer system, wherein the particular computer is a test object, and wherein the test system comprises the following features: a simulation server configured to emulate the test object; and a control entity for controlling the simulation server, wherein the control entity is configured to instruct the simulation server to generate a virtual test object for emulating the test object, wherein the control entity is further configured to instruct the test entity to test the virtual test object generated by the simulation server instead of the particular computer.

Such a test system offers the advantage of a simple and safe test of computers of a computer system. With the simulation server the test object can be emulated, so that the virtual test object instead of the real test object can be tested. Safety problems that are present during direct access to the computer will thus be removed, as not the real computer but the virtual test object will be tested. If a safety threat comes out from the test entity, this thus hits the virtual test object on the simulation server, but not the real computer itself. The simulation server seals the computer off from the test entity and forms a "honeypot", i.e., the simulation server serves as a distraction in order to induce potential malware or viruses on the test entity to attack or affect the simulation server instead of the real computer. The safety thereby increases during the test of the computer system.

Furthermore, such a simulation server is realizable without high complexity. As each computer can be tested in the same way via the simulation server, the test entity only needs to communicate with the simulation server to implement the test tasks. This obviates the need for the installation of particular software packages on all the computers to be tested, which would be necessary, for instance, for testing the individual computer during a realization of agents. After completion of the test of a computer, the virtual test object on the simulation server can be deleted again in an easy way, and the next virtual test object can be generated on the simulation server.

In an embodiment of the test system according to the first aspect as such, the test system is configured to receive data of the test object and to emulate the test object based on the received data on the simulation server.

This provides the advantage that the test object can be emulated based on data of the test object, so that here selection of data, which are relevant for emulating, can be made. Thus, the whole test object, i.e., the computer with all installed software and all data, does not need to be replicated, but instead it is sufficient if the emulation can be generated based on a selection of data. For instance, the computer can transmit its current installed software, patches, and/or configurations to the simulation server, so that the virtual test object can replicate the software, patches, configurations installed on the computer.

In an embodiment of the test system according to the first aspect as such, the data of the test object comprises at least one of the following information: software statuses of a software installed on the test object, patch statuses of patches installed on the test object, configuration statuses of configurations of the test object.

This provides the advantage that the emulation of the computer can be generated on the basis of a selection of data which are currently relevant to the test entity. The computer can transmit its currently installed software, patches, and/or configurations to the simulation server, so that the virtual test object can replicate the software, patches, configurations installed on the computer. The selection can be made by the control of the test entity.

In an embodiment of the test system according to the first aspect as such, the test system is configured to receive the data of the test object by a direct file transfer between the test object and the test system or based on an interaction with a user of the test system.

This provides the advantage that the data of the test object can be flexibly brought to the simulation server. Firstly, an automatic file transfer is feasible, which can be initialized not only by the test object but also the simulation server. Secondly, a manual interaction with a user is feasible, so that an operator of the test system can let special computers be tested, for instance, when there is a safety suspicion for such kind of computer.

In an embodiment of the test system according to the first aspect as such, the control entity is configured to test at regular intervals if data of a new test object are available on the simulation server, and in presence of data to instruct the simulation server to generate a virtual test object for emulating the new test object and to instruct the test entity to test the virtual test object.

This provides the advantage that the computers of the computer system can be tested successively by emulating corresponding virtual test objects on the simulation server. It is thus possible to test a large number of test objects via a single simulation server. Therefore, the test system is realized efficiently and the cost for testing a large number of test objects is low. For each test object the same method can also be used to generate the virtual test object.

In an embodiment of the test system according to the first aspect as such, the control entity is configured to receive data and further parameters for controlling via an application-programmable interface, and to instruct the simulation server to generate a virtual test object for emulating the new test object and to instruct the test entity to test the virtual test object.

This provides the advantage that the control entity can be programmed or adjusted to be user specific and thus offers high flexibility.

In an embodiment of the test system according to the first aspect as such, the control entity is configured to receive test results of the test of the virtual test object from the test entity.

This provides the advantage that all test results on the control entity are available and easily accessible. For instance, the control entity can graphically process test results to display the results clearly.

In an embodiment of the test system according to the first aspect as such, the test system comprises a first test interface between the control entity and the test entity, wherein the first test interface comprises an application-programmable interface.

This provides the advantage that the test entity can be controlled or programmed via the first test interface. Thus, the test system can be used with different test entities, which for instance can come from different producers.

In an embodiment of the test system according to the first aspect as such, the test system comprises a second test interface between the simulation server and the test entity, wherein the second test interface is configured to load Plug-Ins provided by the test entity for testing the virtual test object on the simulation server.

This provides the advantage that the test entity can control the test of the virtual test object on the simulation server via the second test interface. The test tasks which take place on the simulation server can be defined via the Plug-Ins provided by the test entity.

In an embodiment of the test system according to the first aspect as such, the simulation server is configured to scan the virtual test object via the Plug-Ins provided by the test entity according to a predetermined software status, patch status or configuration status.

This provides the advantage that a query of software statuses, patch statuses, and/or configurations of the computer of the computer system can be performed fast and efficiently. Thus, an insight into the software/patch/configuration status of large computer systems, such as switching centers with a plurality of servers for switching communication connections or routers with a plurality of processor modules for routing connections etc., can be obtained fast and easily.

In an embodiment of the test system according to the first aspect as such, the simulation server has access data to the test object, which are valid only on the virtual test object and only for a period of the testing of the virtual test object.

This provides the advantage of increased safety, as the test system, which for instance can originate from an external provider and can thus be classified as unsafe, obtains no direct access to the computer or the real test object. When the access data are valid only on the virtual test object, the safety of the real test object cannot be harmed. When the access data are valid only over a test period, a misuse at other times can be excluded.

According to a second aspect as such the disclosure relates to a method for testing a particular computer of a particular computer system in a test network, wherein the test network comprises a test entity for testing computers of the computer system, wherein the particular computer is a test object, and wherein the method comprises the following steps: generating a virtual test object for emulating the test object on a simulation server; instructing the test entity to test the virtual test object generated on the simulation server instead of the particular computer.

Such a method offers the advantage of a simple and safe test of computers of a computer system. The test object can be emulated with the generation of the virtual test object on the simulation server, so that the virtual test object instead of the real test object can be tested. Safety problems that are present during direct access to the computer are thus removed, as not the real computer but the virtual test object is tested. The method thereby increases the safety during the test of the computer system.

Furthermore, with the method each computer can be tested in the same way via the simulation server. After completion of the test of a computer, the virtual test object on the simulation server can be deleted again in an easy way and the next virtual test object can be generated and tested on the simulation server. The method is thus easy to realize without high effort.

In an embodiment of the method according to the second aspect as such, the method further comprises: scanning the virtual test object for at least one of the following data: software statuses of a software installed on the test object, patches installed on the test object, configuration statuses of configurations of the test object.

This provides the advantage that a query of software statuses, patch statuses, and/or configurations of the computer of the computer system can be performed fast and efficiently. Thus, insight into the software/patch/configuration status of large computer systems can be obtained fast and easily.

In an embodiment of the method according to the second aspect as such, the method further comprises: testing if data of the test object are available on the simulation server; in presence of data of the test object: instructing the simulation server to generate a virtual test object based on the data of the test object; instructing the test entity to test the virtual test object; receiving test results of the test of the virtual test object; and deleting the virtual test object on the simulation server.

This provides the advantage that the method with help of these steps can be realized in a fast and uncomplicated manner. These five steps of the testing, instructing the simulation server, instructing the test entity, receiving and deleting can be performed successively or also parallel under certain circumstances for any number of test objects to obtain test results quickly.

According to a third aspect as such the disclosure relates to a computer program for an application-programmable interface between the control entity of a test system according to the first aspect and a test entity in a test network, comprising: a first program module configured to transmit an identification of a virtual test object generated by the simulation server to the test entity; a second program module configured to instruct the test entity to test the virtual test object instead of the particular computer; and a third program module configured to instruct the test entity to transmit results of the test of the virtual test object to the control entity.

Such a computer program offers the advantage that it provides an application-programmable interface with a test entity. Thus, an arbitrary test entity can be used in the test system, wherein the adaptation of the test entity to the simulation server takes place/is performed via the application-programmable interface.

In an embodiment of the method according to the third aspect as such, the computer program comprises a fourth program module configured to instruct the test entity to scan the virtual test object for at least one of the following data: software statuses of a software installed on the test object, patch statuses of patches installed on the test object, configuration statuses of configurations of the test object.

This provides the advantage that a query of software statuses, patch statuses, and/or configurations of the computer of the computer system can be performed fast and efficiently via the application-programmable interface. Thus, the test tasks of the test entity can be allocated and performed fast and easily.

In the following detailed description, reference is made to the accompanying drawings, which form part of the disclosure, and in which are shown, by way of illustration, specific aspects in which the present disclosure may be placed. It will be appreciated that other embodiments may be utilized and structural or logical changes may be made without departing from the concept of the present disclosure. The following detailed description, therefore, is not to be taken in a limiting sense. It will be further appreciated that the features of the various exemplary aspects described herein may be combined with each other, unless specifically noted otherwise.

The aspects and embodiments are described with reference to the drawings, wherein the same reference signs refer to the same elements in general. In the following description, numerous specific details are demonstrated for explanatory purposes to provide an in-depth understanding of one or more aspects of the disclosure. For a person skilled in the art, it can be, however, obvious that one or more aspects or embodiments can be implemented with a lower degree of the specific details. In other cases known structures and elements are illustrated in schematic form to facilitate the description of one or more aspects or embodiments. It will be appreciated that other embodiments may be utilized and structural or logical changes may be made without departing from the concept of the present disclosure.

While a particular feature or a particular aspect of an embodiment may have been disclosed with respect to only one of several implementations, such feature or aspect may be also combined with one or more other features or aspects of the other implementations as may be desired and advantageous for any given or particular application. Furthermore, to the extent that the terms "include", "have", "with", or other variants thereof are used in either the detailed description or the claims, such terms shall be inclusive in a manner similar to the term "comprise". The terms "coupled" and "connected" may have been used along with derivatives. It should be understood that these terms may have been used to indicate that two elements cooperate or interact with each other regardless of whether they are in direct physical or electrical contact, or they are not in direct contact with each other. Also, the terms "exemplary", "for example" and "e.g." are merely meant as an example, rather than the best or optimal. The following description, therefore, is not to be understood in a limiting sense.

Figure 1:
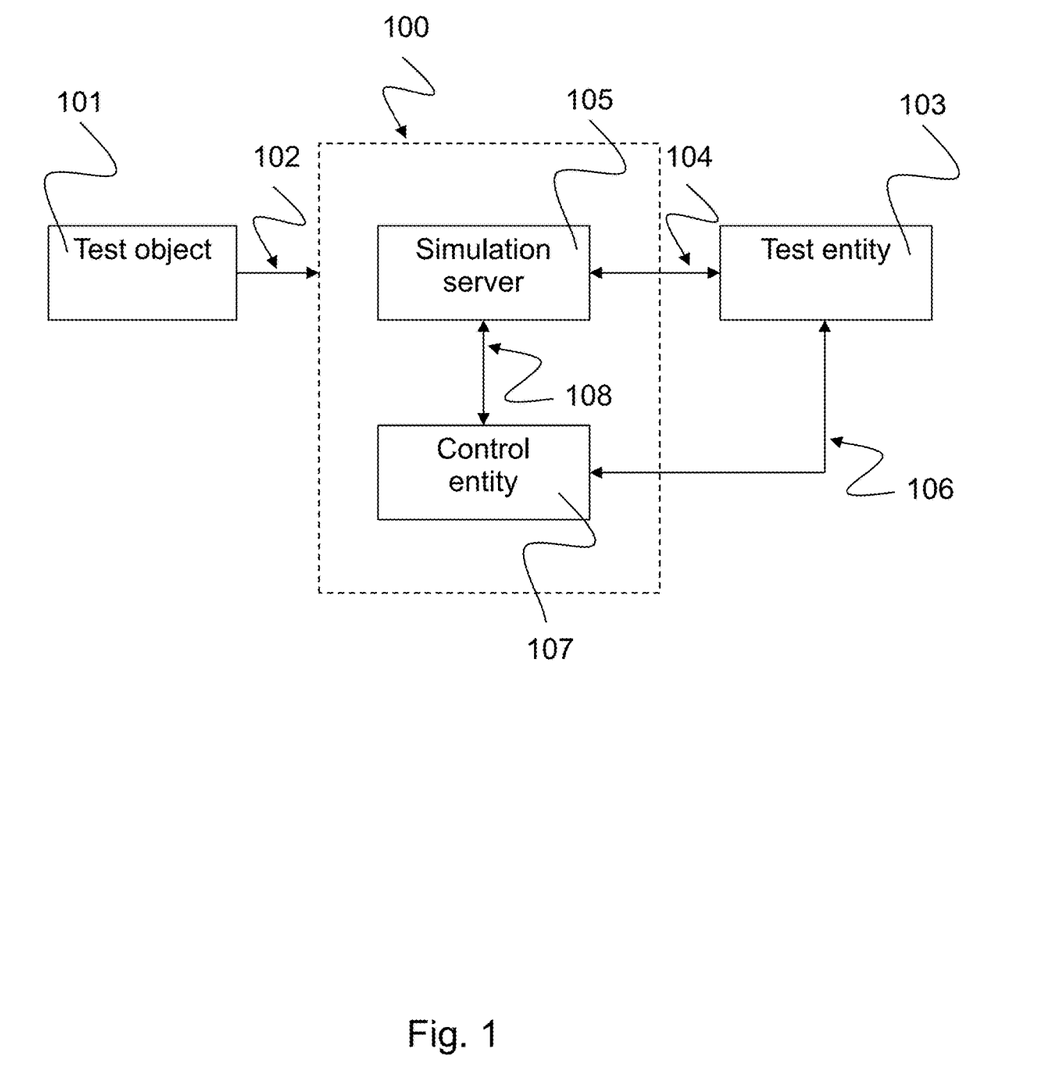
FIG. 1 is a schematic diagram of a test system 100 according to a first embodiment.

FIG. 1 shows a schematic diagram of a test system 100 according to a first embodiment. The test system 100 allows the test of a particular computer of a particular computer system in a test network, i.e., it can be a particular computer selected from a computer system and be subject to a test. Furthermore, a particular computer system can be selected from a plurality of different computer systems and be subject to the test. The test network comprises a test entity 103 for testing computers of the computer system. The particular computer is hereby the test object 101.

The test system 100 comprises a simulation server 105 and a control entity 107, which are coupled via a control interface 108. The simulation server 105 allows emulating the test object 101. The control entity 107 allows controlling the simulation server 105. The control entity 107 instructs the simulation server 105 to generate a virtual test object for emulating the test object 101 and instructs the test entity 103 to test the virtual test object generated by the simulation server 105, instead of the particular computer 101.

The test system 100 receives data 111 of the test object 101 via a test interface 102 between the test object and the test system 100, and emulates the test object 101 based on the received data 111. The data 111 of the test object 101 can be software statuses of software installed on the test object 101, patch statuses of patches installed on the test object 101, configuration statuses of configurations of the test object 101 or other data. The test interface 102 can be a simple file-transfer interface (based on protocols like FTP, SCP, SMPT, . . . ) as well as an application-programmable interface, via which not only configuration data but also further parameters for controlling the test system can be transferred.

The test system 100 can receive the data 111 of the test object 101 by a direct file transfer between the test object 101 and the test system 100 or based on an interaction with a user of the test system 100 (not illustrated in FIG. 1). If the test system 100 receives data 111 of a test object 101, then the control entity 107 instructs the simulation server 105 to generate a virtual test object for emulating the new test object 101 and instructs the test entity 103 to test the virtual test object 109. The control entity 107 can receive test results of the test of the virtual test object from the test entity.

The test system 100 comprises a first test interface 106 between the control entity 107 and the test entity 103. The first test interface 106 can be an application-programmable interface. The test system 100 comprises a second test interface 104 between the simulation server 105 and the test entity 103. Via the second test interface 104, Plug-Ins provided by the test entity 103 for testing the virtual test object 109 on the simulation server 105 can be loaded. The simulation server 105 can scan the virtual test object via the Plug-Ins provided by the test entity 103 according to a predetermined software status, patch status or configuration status.

The simulation server 105 has access data to the test object 101. These access data can be valid for instance only on the virtual test object. Furthermore, these access data can be valid only for a period of the testing of the virtual test object.

Figure 2:
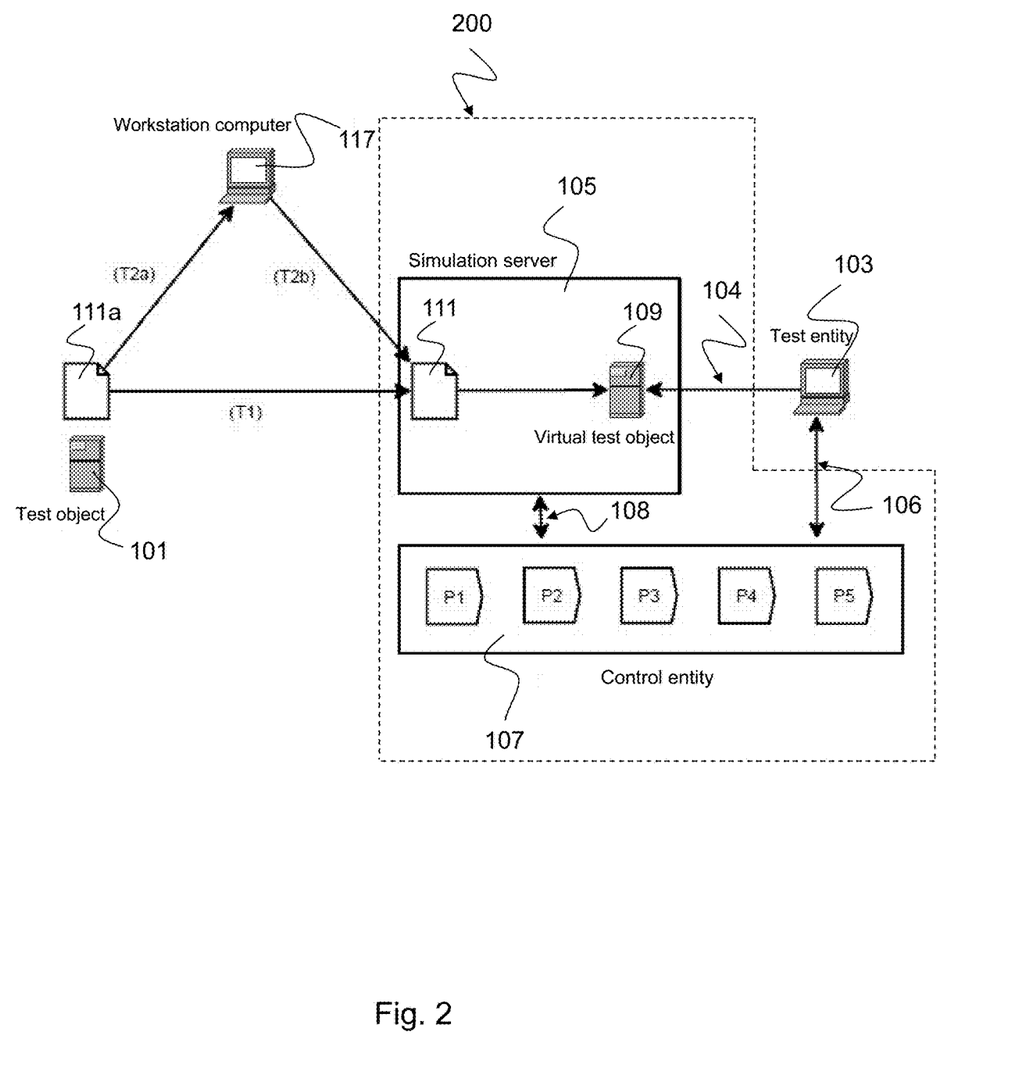
FIG. 2 is a schematic diagram of a test system 200 according to a second embodiment.

FIG. 2 shows a schematic diagram of a test system 200 according to a second embodiment. The test system 200 can correspond to the test system 100 described above in FIG. 1. The test interface 102 can be implemented directly between test object 101 and test system 200, so that a file 111*a* generated on the test object can be transmitted directly to the test system 200 via file transfer T1. The test interface 102 can run alternatively via a workstation computer 117 installed between test object 101 and test system 200, so that a file 111*a* generated on the test object can be transmitted, for instance, first via a first file transfer T2*a* to the workstation computer 117 and then, for instance, via a second file transfer T2*b* from the workstation computer 117 to the test system 200. A user has the possibility to change the transmitted file 111*a* on the workstation computer 117, so that the existing file 111 on the test system 200 can differ from the file 111*a* generated on the test object 101 in certain circumstances.

The control entity 107 can be implemented on a computer, for instance, on a server. It can even be implemented also on the simulation server 105, so that the control interface 108 forms an internal interface. The control entity 107 can further be implemented as an application software (App) on a separated computer or processor, for instance, a control computer for controlling the simulation server 105.

It can be seen in FIG. 2 that the virtual test object 109 is generated on the simulation server 105.

FIG. 2 shows a test system 200, wherein a central active test entity 103 is used, which however accesses only the simulation server 105, which simulates the objects 101 to be tested using data 111 received from the test object 101 beforehand. For this purpose, the data 111*a* is generated on the test object 101 and transferred on the simulation server. This can be implemented either via a direct file transfer T1 between the test object 101 and the simulation server 105 or initiated manually via a user using an optional workstation computer 117 (T2*a* and T2*b*). The control entity 107 tests at regular intervals if new data 111 are available on the simulation server (process step P1). If this is the case, then a virtual test object 109 is generated on the simulation server 105, which simulates the test object 101 for the test entity 103 using data 111 of the test object 101 (process step P2). The control entity 107 then triggers the test entity 103 and instructs it to test the virtual test object 109 (process step P3). In case an internal test is necessary, access data can thus be used, which are valid only on the virtual test object 109 and only for the period of the test. After completion of the tests, the test entity 103 provides the test results for the control entity 107 (process step P4). Thereafter, the control entity ends the execution of the virtual test object 109 on the simulation server 105 (process step P5).

Such a test system 200 provides diverse advantages over the direct access of a test entity 103 to a test object 101, in particular when a plurality of test objects 101 are to be tested. A central entity which requires access to many network elements is also connected with safety risks all the time, for example, when using the test entity 103 as central entity, as on the one hand it requires access to all network elements from a network-technical viewpoint, but on the other hand it must also have access data (for instance user name and password) of the test object 101 in many cases. In case of a compromise of the test entity 103, an attacker would thereby have access to a plurality of network elements. This risk does not exist here in the introduced test system, as the test entity 103 has no direct access to the network elements but the access takes place via the test system 200 comprising the simulation server 105 and control entity 107.

In an embodiment of the test system 200, the simulation server 105 forms a honeypot, i.e., a server, which simulates the network services of a computer, a whole computer network or the behavior of a user. In addition to the partition of the test object 101, the honeypot can be used against an attacker in order to obtain information about attack patterns and attacker behavior. If access to such a virtual service or user take places, all related actions can be recorded and an alarm can be triggered if necessary. The valuable real network or computer system remains as exempt as possible from attack attempts, because it is better secured than the honeypot or the simulation server 105. The idea behind honeypot-services of the simulation server 105 is to install one or more honeypots in a network, which do not provide services required by the user himself or his communication partners and are, therefore, never addressed in normal operation. An attacker, who cannot distinguish between real servers or programs and honeypots and routinely examines all network components for weak points, will sooner or later make use of the services offered by a honeypot and thereby be recorded by the honeypot. Since it is an unused system, every access to it is to be evaluated as a possible attack attempt. The simulation server 105 thus serves as a virtual test object to enable testing of the computers of the computer system, and also as honeypot to repel and record attacks on the computer network at the same time.

The test entity 103 can be a manufacturer-specific server, via which a test of the computer system takes place. For example, the test entity 103 can comprise a Nessus server. Nessus is a network and security scanner. It is based on the client-server principle, which means that the Nessus server is started on a computer and that it is subsequently possible to connect to one or more clients, either from a local or a remote computer. This is secured by SSL certificates and passwords. When the server is started, the plug-ins are loaded automatically. With these plug-ins, diverse security holes of the operating system or the services running on the host to be scanned can be found. The plug-ins are created in Nessus-particular scripting language "Nessus Attack Scripting Language" (NASL). With the help of the client program, it is possible to connect to the server and creates a session (session), wherein one can register or change the plug-ins, the target host and other settings. If the scan was performed on a host, the Nessus client provides an overview of the open ports and possible found safety holes.

For example, the test entity 103 can comprise a Qualys-server. With such a server, the computer system can be scanned. Safety holes or potential hazards can be discovered and the appropriate patches can be provided to correct the safety holes. With the Qualys-server interactive scan reports can be recorded, for example per threat or per patch. Websites and apps can be tested for top risks and malicious software. Furthermore, computers can be evaluated for security, for example with regard to SCAP (Security Content Automation Protocol) or OWASP (Open Web Application Security Project), SCAP is a method for using particular standards for automated vulnerability-management-, measurement-, and policy-compliance-evaluation. OWASP is a standardization organization with the aim to improve the safety of applications and services on the World Wide Web.

Figure 3:
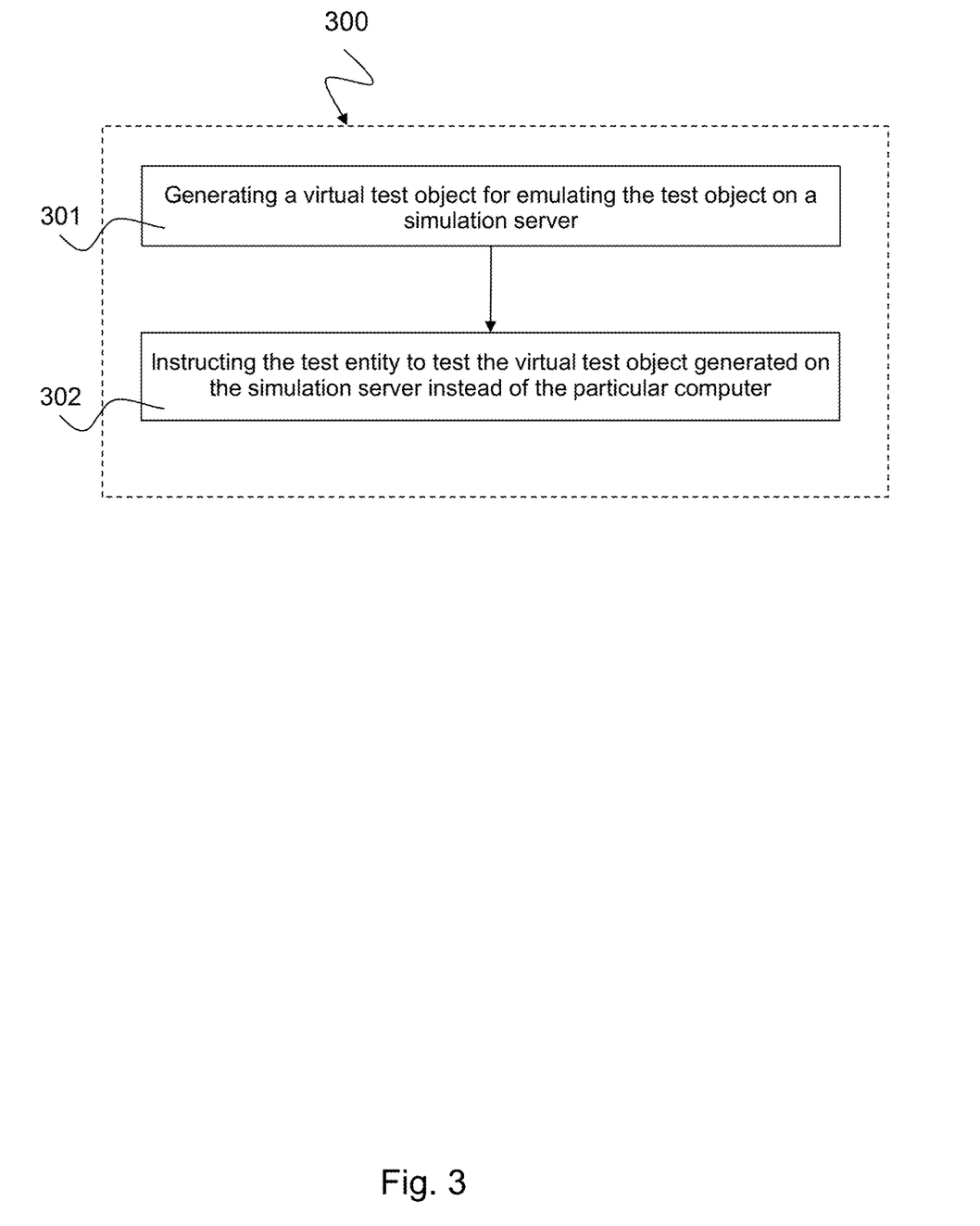
FIG. 3 is a schematic diagram of a method 300 for testing a computer of a computer system according to an embodiment.

FIG. 3 shows a schematic diagram of a method 300 for testing a computer of a computer system according to an embodiment.

With the method 300, a particular computer 101 of a particular computer system in a test network can be tested, wherein the test network comprises a test entity 103 for testing computers of the computer system, and wherein the particular computer 101 is a test object 101, as described above in FIGS. 1 and 2. The method 300 comprises the following steps: generating 301 a virtual test object 109 for emulating the test object 101 on a simulation server 105, for example as described correspondingly in FIGS. 1 and 2; and instructing 302 the test entity 103 to test the virtual test object 109 generated on the simulation server 105 instead of the particular computer 101, for example, as described correspondingly in FIGS. 1 and 2.

The method 300 can further comprise the following step: scanning the virtual test object 109 for at least one of the following data: software statuses of a software installed on the test object 101, patch statuses of patches installed on the test object 101, configuration statuses of configurations of the test object 101, for instance as described correspondingly in FIGS. 1 and 2.

The method 300 can further comprise the following five steps P1, P2, P3, P4, P5, which for instance can be implemented on the control entity 107 as described above in FIGS. 1 and 2: testing (P1) if data 111 of the test object 101 are available on the simulation server 105; in presence of data 111 of the test object 101: instructing the simulation server 105 to generate (P2) a virtual test object 109 based on the data 111 of the test object 101; instructing the test entity 103 to test (P3) the virtual test object 109; receiving (P4) test results of the test of the virtual test object 109; and deleting (P5) the virtual test object 109 on the simulation server 105.

Figure 4:
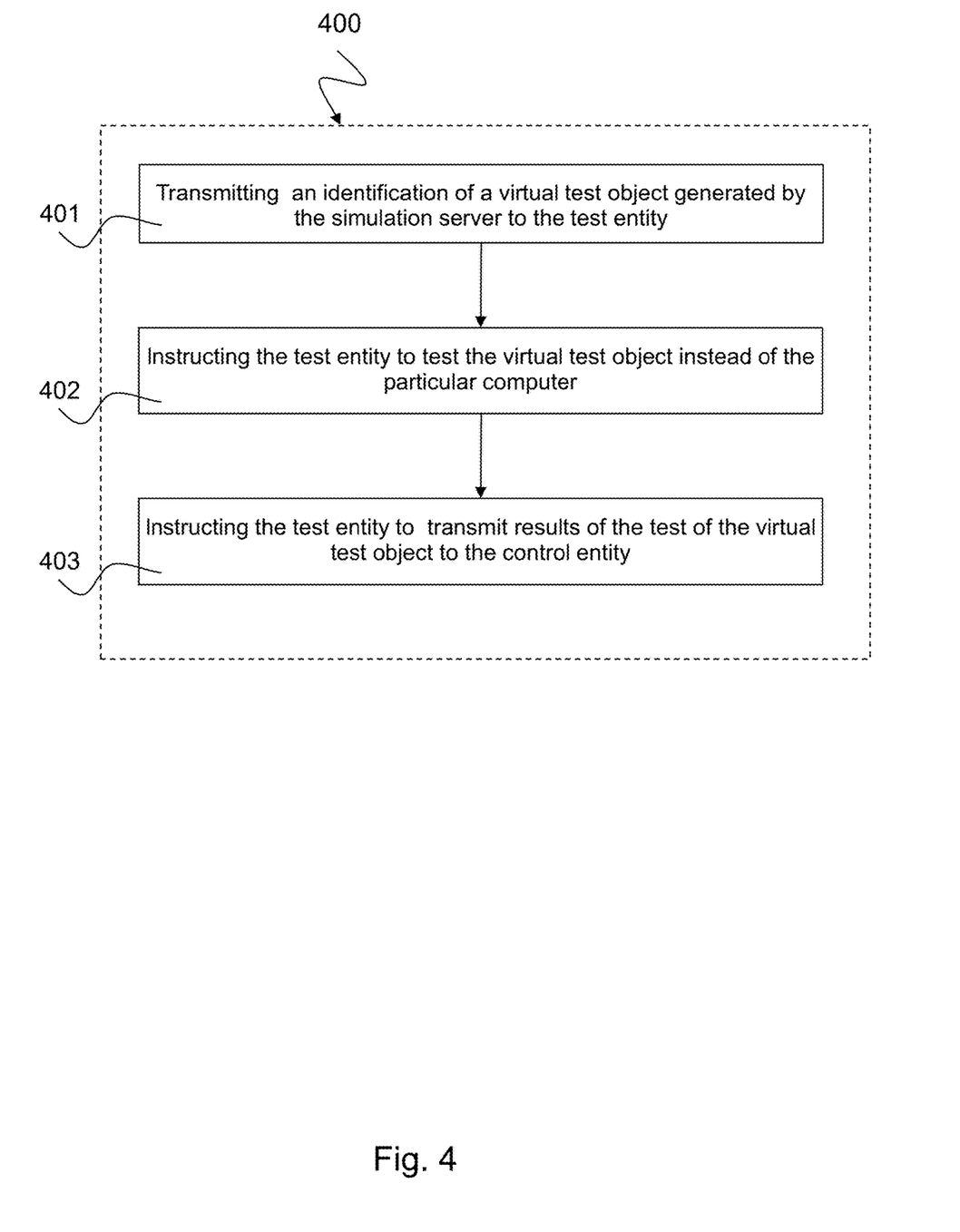
FIG. 4 is a schematic diagram of an application program 400 of an application-programmable interface between a control entity and a test entity according to an embodiment.

FIG. 4 shows a schematic diagram of an application program 400 of an application-programmable interface between a control entity and a test entity according to an embodiment. The application-programmable interface can, for example, be a test interface 106 between a control entity 107 and a test entity 103 in a test system 100, 200, as described in detail above in FIGS. 1 and 2.

The computer program 400 comprises a first program module 401, a second program module 402, and a third program module 403. The first program module 401 is configured to transmit an identification of a virtual test object 109 generated by the simulation server 105, for example an address of the file 111 with data of the test object 101, to the test entity 103. The second program module 402 is configured to instruct the test entity 103 to test the virtual test object 109 instead of the particular computer 101. The third program module 403 is configured to instruct the test entity 103 to transmit the results of the test of the virtual test object 303 to the control entity 107, for example to deposit in a memory of the control entity 107 applied for this purpose.

The computer program 400 can further comprise a fourth program module configured to instruct the test entity 103 to scan the virtual test object 101 for at least one of the following data: software statuses of a software installed on the test object 101, patch statuses of patches installed on the test object 101, configuration statuses of configurations of the test object 101.

A further aspect of the invention includes a computer program product, which can be loaded directly in the internal memory of a digital computer and comprises software code sections, with which the method 300 described in FIG. 3 can be executed if the product runs on a computer. The computer program product can be stored on a computer-compatible medium and comprise the following: a computer-readable program, which prompts a simulation server to generate a virtual test object for emulating a test object; and instructs a test entity to test the virtual test object generated on the simulation server instead of the particular computer.

The computer can be a PC, for example, a PC of a computer network. The computer can be realized as a chip, an ASIC, a micro-processor or a signal processor and can be arranged in a computer network, for example in a computer system as described in one of the FIGS. 1 to 2.

It is to be understood that the features of the different embodiments described exemplarily herein can be combined with one another unless specifically specified elsewise.

As illustrated in the description and drawings, individual elements which have been shown in connection are not directly related to one another; intermediate elements can be provided between the connected elements. Further, it is to be understood that embodiments of the invention can be implemented in individual circuits, partial integrated circuits or fully integrated circuits or programming. The term "for example" is merely meant as an example and not as the best or optimal. Certain embodiments have been illustrated and described herein, but it will be apparent to those skilled in the at that a variety of alternate and/or similar implementations may be realized instead of the illustrated and described embodiments without departing from the concept of the present disclosure.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

100: Test system
101: Test object or particular computer of a particular computer system
102: Test interface
103: Test entity
104: Second test interface (between simulation server and test entity)
105: Simulation server
106: First test interface (between control entity and test entity)
107: Control entity
108: Control interface (between control entity and simulation server)
109: Virtual test object
111a: Data of the test object generated on test object
111: Data of the test object received on simulation server
117: Workstation computer
T1: file transfer between test object and simulation server
T2a: file transfer between test object and workstation computer
T2b: file transfer between workstation computer and simulation server
300: Method for testing
301: 1st step of method: generating a virtual test object
302: 2nd step of method: instructing the test entity
400: Computer program for an application-programmable interface between control entity and test entity
401: 1st Program module
402: 2nd Program module
403: 3rd Program module

The invention claimed is:

1. A test system, comprising:
a simulation server configured to receive data of a computer of a computer network via a direct file transfer between the computer and the test system, wherein the received data includes a software status, a patch status, and/or a configuration status of the computer; and
a controller configured to instruct the simulation server to emulate the computer by generating a virtual test object corresponding to the computer;
wherein the simulation server is further configured to emulate the computer based on the received data by generating the virtual test object corresponding to the computer based on replicating the software status, the patch status, and/or the configuration status of the computer; and
wherein the controller is further configured to:
instruct a test entity to test the virtual test object generated by the simulation server, wherein the test entity has access to the simulation server but not to the computer, and wherein testing the virtual object comprises scanning the virtual test object according to a software status, a patch status, and/or a configuration status of the virtual test object;
test at regular intervals whether data of a new computer is available on the simulation server; and
based on the data of the new computer being available on the simulation server, instruct the simulation server to generate a new virtual test object corresponding to the new computer and instruct the test entity to test the new virtual test object.

2. The test system according to claim 1, wherein the controller is configured to receive data and further parameters via an application-programmable interface.

3. The test system according to claim 1, wherein the controller is configured to receive test results of the test of the virtual test object from the test entity.

4. The test system according to claim 1, further comprising:
a first test interface between the controller and the test entity, wherein the first test interface comprises an application-programmable interface.

5. The test system according to claim 4, further comprising:
a second test interface between the simulation server and the test entity, wherein the second test interface is configured to load plug-ins provided by the test entity for testing the virtual test object on the simulation server.

6. The test system according to claim 1, wherein the simulation server has access data corresponding to the computer, wherein the access data is valid only on the virtual test object and only for a period of the testing of the virtual test object.

7. A method, comprising:
testing, by a controller of a test system, at regular intervals whether data of a new computer is available on a simulation server of the test system;
receiving, by the simulation server, data of a computer of a computer network via a direct file transfer between the computer and the test system, wherein the received data includes a software status, a patch status, and/or a configuration status of the computer;

based on the data of the computer being available on the simulation server, instructing, by the controller, the simulation server to generate a virtual test object corresponding to the computer;

generating, by the simulation server, the virtual test object for emulating the computer on the simulation server based on replicating the software status, the patch status, and/or the configuration status of the computer;

instructing, by the controller, a test entity to test the virtual test object generated on the simulation server, wherein the test entity has access to the simulation server but not to the computer, and wherein testing the virtual object comprises scanning the virtual test object according to a software status, a patch status, and/or a configuration status of the virtual test object;

receiving, by the controller, test results of the test of the virtual test object; and deleting the virtual test object on the simulation server.

8. The method according to claim 7, further comprising:

scanning the virtual test object for at least one of the following data:
software statuses of software installed on the computer,
patch statuses of patches installed on the computer, or
configuration statuses of configurations of the computer.

9. One or more non-transitory, computer-readable mediums having processor-executable instructions stored thereon, wherein the processor-executable instructions, when executed, facilitate performance of the following:

testing, by a controller of a test system, at regular intervals whether data of a new computer is available on a simulation server of the test system;

receiving, by the simulation server, data of a computer of a computer network via a direct file transfer between the computer and the test system, wherein the received data includes a software status, a patch status, and/or a configuration status of the computer;

based on the data of the computer being available on the simulation server, instructing, by the controller, the simulation server to generate a virtual test object corresponding to the computer;

generating, by the simulation server, the virtual test object for emulating the computer on the simulation server based on replicating the software status, the patch status, and/or the configuration status of the computer;

instructing, by the controller, a test entity to test the virtual test object generated on the simulation server, wherein the test entity has access to the simulation server but not to the computer, and wherein testing the virtual object comprises scanning the virtual test object according to a software status, a patch status, and/or a configuration status of the virtual test object;

receiving, by the controller, test results of the test of the virtual test object; and deleting the virtual test object on the simulation server.

10. The one or more non-transitory computer-readable mediums according to claim 9, wherein the processor-executable instructions, when executed, further facilitate:

instructing the test entity to scan the virtual test object for at least one of the following data:
software statuses of a-software installed on the computer,
patch statuses of patches installed on the computer, or
configuration statuses of configurations of the computer.

11. The test system according to claim 1, wherein the test entity communicates with the simulation server and the controller but does not have direct access to any network element of the computer network.

12. The test system according to claim 1, wherein the simulation server is further configured to simulate network services provided by the computer and to serve as a honeypot to obtain record information relating to attacks on the computer network.

13. The test system according to claim 1, wherein the test entity comprises a server configured to scan the virtual test object to detect vulnerabilities.

14. The test system according to claim 1, wherein the simulation server is further configured to load plug-ins provided by the test entity for testing the virtual test object on the simulation server.

* * * * *